Sept. 6, 1932.   E. F. MAAS   1,875,385
EXPANSIBLE PULLEY
Filed Sept. 20, 1926   2 Sheets-Sheet 1

INVENTOR
*Elov. F. Maas.*
BY
ATTORNEY

Sept. 6, 1932.   E. F. MAAS   1,875,385

EXPANSIBLE PULLEY

Filed Sept. 20, 1926   2 Sheets-Sheet 2

INVENTOR
Elof F. Maas.
BY
ATTORNEY

Patented Sept. 6, 1932

1,875,385

UNITED STATES PATENT OFFICE

ELOV F. MAAS, OF AKRON, OHIO, ASSIGNOR TO THE GOODYEAR TIRE & RUBBER COMPANY, OF AKRON, OHIO, A CORPORATION OF OHIO

EXPANSIBLE PULLEY

Application filed September 20, 1926. Serial No. 136,419.

My invention relates to pulleys, and it has particular reference to a type of pulley whose peripheral surface is extensible.

In the process of manufacturing pneumatic tires, it is desirable to assemble layers of rubberized fabric in superposed relation. This operation is performed by conducting the individual layers of material, at predetermined and synchronized speeds, by means of belt conveyors, to a machine wherein the assembling operation is effected. The speeds of the conveyor belts must be regulated within very close limits, and hence it is necessary to provide means to compensate for variations in speed that occur during the course of manufacture. Proper regulation may be obtained by employing an expansible pulley in the belt conveyor system which may be adjusted to alter the speed of the conveying belt.

The primary object of the invention resides in the provision of an expansible pulley which, while having a general range of application, is especially adapted for use in a belt conveyor to effect fine adjustments in the speed of the belt.

Another object of the invention is to provide an expansible pulley whose peripheral mid-portion is expansible, but whose outer peripheral portions are substantially inexpansible.

Additional objects, and the advantages to be derived from a practice of the invention, will become apparent from a perusal of the following detailed description of a preferred embodiment of the invention, illustrated in the accompanying drawings, wherein.

Figures 1, 2:
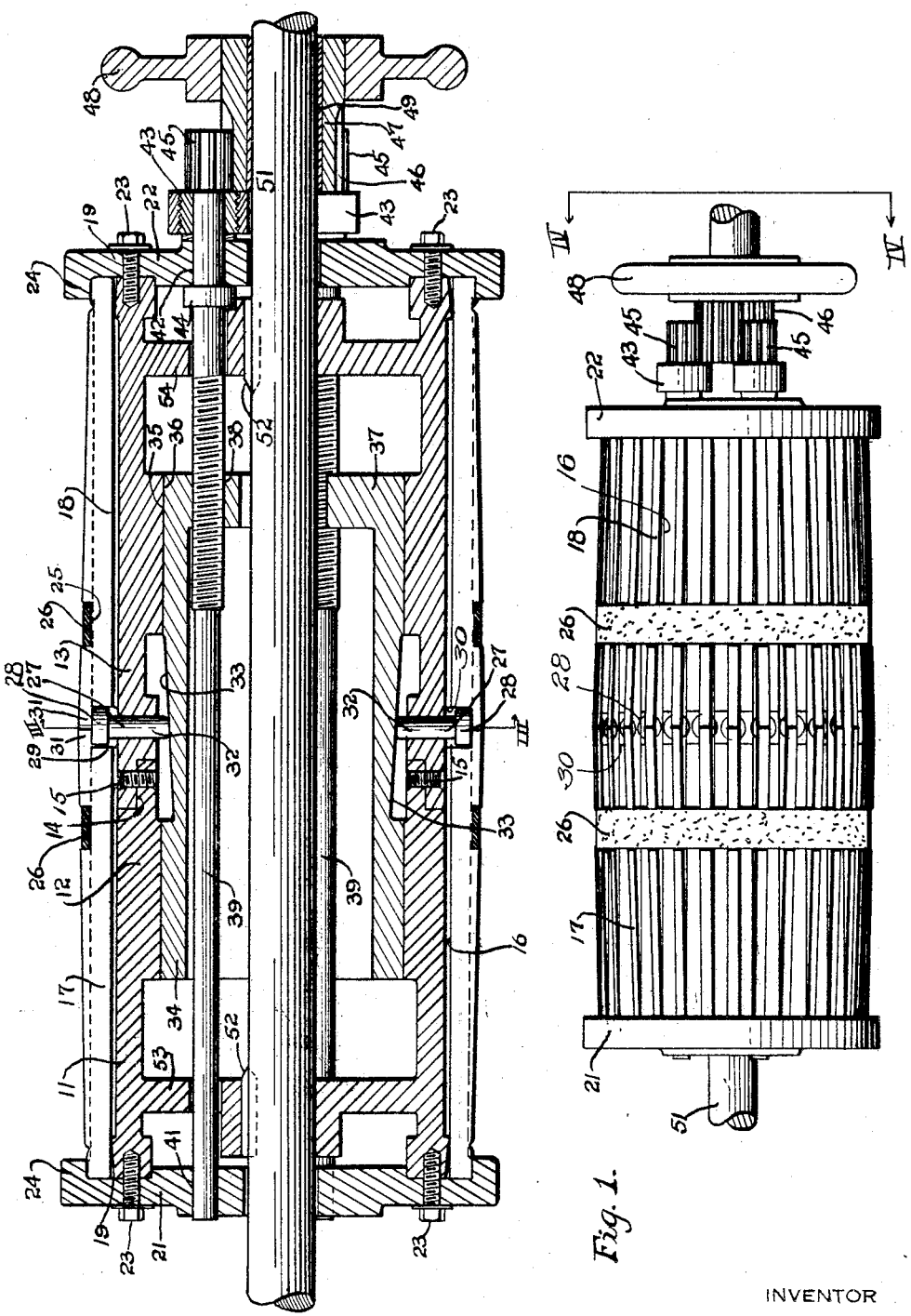
Fig. 1 is a plan view of a pulley incorporating the principles of the invention.
Fig. 2 is a longitudinal cross-sectional view of the pulley shown in Fig. 1.
Figure 3:
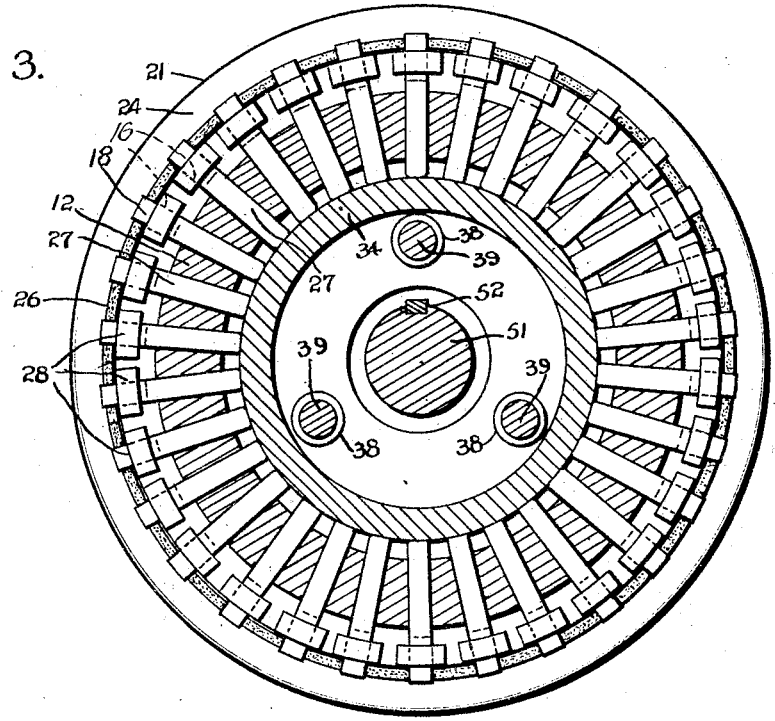
Fig. 3 is a cross-sectional view, drawn on a larger scale, taken substantially along the line III—III of Fig. 2; and, Fig. 4 is an end elevational view taken substantially along the line IV—IV of Fig. 1, parts being broken away.
Figure 4:
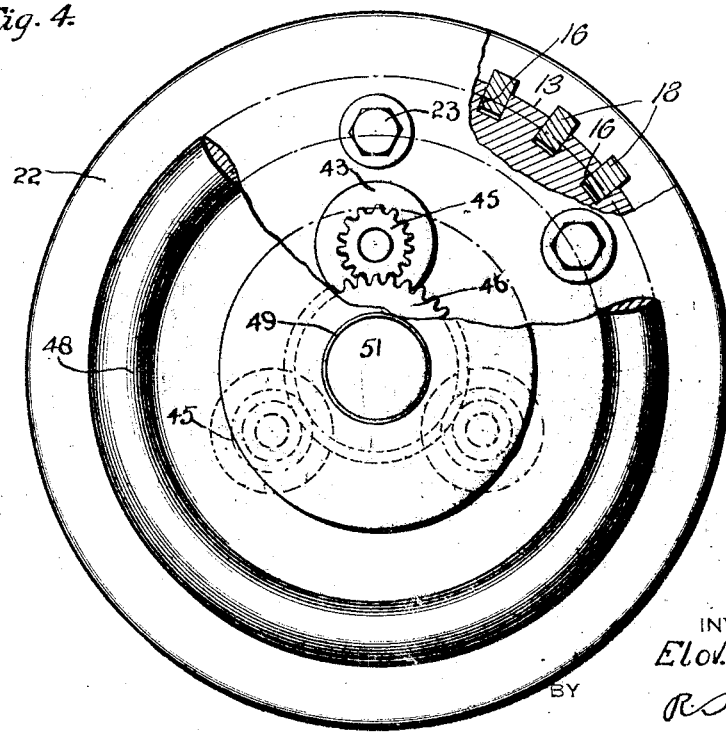

As best illustrated in Fig. 2, the pulley comprises a cylindrical member or drum 11 that is formed in two sections 12 and 13, the adjoining ends of which are provided with interlocking projections and recesses 14. Suitable means, such as machine screws 15, are provided to retain the sections 12 and 13 in fixed relation. The outer surface of the drum 11 is formed with a plurality of axially disposed slots 16, in which are positioned in end to end relation, a plurality of pairs of extensible members or slats 17 and 18. The separate slats of each pair of extensible members extend from the mid-portion of the drum 11 to the outer edges thereof, where they contact with slightly tapered surfaces 19.

Plates 21 and 22 are secured to the opposite ends of the drum 11 by suitable means, such as bolts 23, and they are provided with flanged portions 24 that overhang the outer portions of the slats 17 and 18, and serve to retain them in position. It will be noted that a limited pivotal movement of each slat is permissible within the end members 21 or 22, by virtue of the provision of the slightly tapered faces 19 on the drum 11.

The inner portions of the slats 17 and 18 are formed with circumferentially aligned recesses 25, in which are disposed continuous bands of elastic material 26, such, for example, as rubber composition. These members maintain the slats in operative position on the surface of the drum 11, but they permit limited outward movement, imparted to the members 17 and 18 by means of mechanism hereinafter described. Because of the service for which the pulley is primarily adapted, the exposed surfaces of the slats are slightly tapered in order to form a centrally disposed crown on the pulley. It will be readily understood, however, that this feature need not be incorporated in all cases.

The means for effecting an extension of the members 17 and 18 consists of a plurality of radially disposed pins 27 that are mounted for sliding movement at the mid-portions of the drum 11, and which are adapted to be actuated by means disposed within the drum and extending axially thereof. Each pin 27 is provided with an enlarged portion or head 28 that fits within a recess 29 formed by undercutting the inner portions of the abutting ends of each pair of slats 17 and 18, and which contacts with an overhanging shoulder 31, formed at the end of each extensible member. An outer circumferential groove 30 formed in the section 13 traverses or intersects the slots 16 and provides space for the portions of the pin heads 28 that project laterally beyond the edges of the slats 17 and 18. The inner portions 32 of the pins 27 bear against a tapered face 33, formed at substantially the mid-portion of a cylindrical sleeve 34 that is positioned within the drum 11 for sliding movement. Contacting cylindrical bearing faces 35 and 36 are respectively formed on the portions 12 and 13 of the drum 11, and the sleeve 34, and they are highly machined in order to permit the sleeve to have a free sliding movement within the drum.

An annular inwardly projecting flange 37 is formed at the end of the sleeve 34 adjacent the plate 22, and it is provided with a plurality of threaded apertures 38 for the reception of elongate threaded rods 39. Each rod is supported in a plurality of aligned bearings 41 and 42, respectively formed in the end plates 21 and 22. The rods 39 extend beyond the plate 22, and their outer ends are provided with interconnecting mechanism by means of which they may be operated.

A collar 43 is secured to the outer portion of each rod 39 adjacent the outer surface of the plate 22, and it is adapted to co-operate with an integrally formed collar 44, positioned on the rod 39 adjacent the inner surface of the plate, to prevent axial movement of the rod with respect to the drum 11. A pinion gear 45 is keyed to the extremity of each rod 39, or formed integrally therewith, and it intermeshes with a gear wheel 46 formed on the hub portion 47 of a hand wheel 48. The hand wheel 48 is loosely mounted, by means of a bearing bushing 49, upon a shaft 51 extending axially of the drum 11, and adapted to rotate therewith by means of key members 52 connecting the shaft rigidly to annular supporting flanges 53 and 54, respectively formed on the members 12 and 13.

It will be observed that under ordinary operating conditions, the pulley and the shaft 51 revolve in unison, and the members 17 and 18 are held in a fixed position by means of the clamping flanges 24 and the elastic bands 26. When it is desired to effect an adjustment of the members 17 and 18, the hand wheel 48 is rotated with respect to the shaft 51, thus causing a rotation of the gears 45 and the rods 39 to which they are secured. Rotation of the rods 39, within the threaded apertures 38 formed with the flange 37, causes a longitudinal movement of the sleeve 34, and this motion, in turn, results in a radial movement of the pins 27. If the motion of the pins 27 be in an outward direction, it is apparent that the members 17 and 18 will likewise be moved outwardly, thus increasing the diameter of the pulley at the mid-portion thereof. If the motion of the sleeve 34 be in the opposite direction, the members 17 and 18 are forced inwardly by the pressure exerted by the elastic bands 26. Practically no expansion or contraction occurs at the end portions of the pulley, where the slats are held in a substantially fixed relation with respect to the surface of the drum 11.

The actual displacement imparted to the members 17 and 18 may, by means of the mechanism described, be made extremely small, and hence very fine adjustments may be effected. It is apparent that if a pulley of this type be employed in a belt conveyor system, the speed of the belt may be regulated within very narrow limits, and that the speed of co-operating belts may be maintained at the same values.

Those skilled in the art may resort to various modifications of the construction, described for the purposes of illustration, without departing from the principles of the invention, and it is also apparent that the pulley may be employed for other purposes than that suggested herein. It is intended, therefore, that the invention should be limited only by the scope of the following claims.

What I claim is:

1. An expansible pulley comprising a plurality of pairs of slats, the members of each pair being arranged in substantially end to end relation about a common axis, means pivotally securing the remote ends of the slats, means engaging the inner adjacent ends of the slats to move them radially outwardly with respect to the axis, and resilient means exerting a continuous yielding force to urge the adjacent ends of the slats radially inwardly.

2. An expansible pulley comprising a plurality of pairs of members disposed in end to end relation about a common axis and equally spaced therefrom, means to secure the outer end of each member with respect to the axis, and means for engaging the members adjacent the inner ends thereof to move them inwardly and outwardly with respect to the axis about the outer ends of the members as pivot points.

3. An expansible pulley comprising a pair of spaced plates having a common axis, a plurality of elongated members disposed at equiradial distances around the axis between the plates, means to secure loosely the outer end of each member to the adjacent plate, and means for engaging the inner ends of each member to vary its position with respect to the axis.

4. An expansible pulley comprising a single rigid non-extensible cylindrical member, a plurality of pairs of slats disposed in end to end relation around the surface of the cylindrical member, means for directly and pivotally securing the outer ends of all of the slats with respect to the cylindrical member, and means to move the inner ends of the slats in a substantially radial direction.

5. An expansible pulley comprising a cylindrical member disposed on a shaft, plates secured to the opposite ends of the cylindrical member, a plurality of pairs of slats disposed about the periphery of the cylindrical member and terminating substantially at the mid-section thereof, means to secure the outer end of each slat adjacent the plates, and radially extensible means disposed at the mid-portion of the cylinder operable to effect movement of the slats.

6. An expansible pulley comprising a cylindrical member, a plurality of pairs of slats disposed in end to end relation on the periphery of the cylindrical member, means to secure the outer ends of the slats in substantially fixed relation to the cylindrical member, a plurality of radially disposed pins positioned in the cylindrical member in contact with the inner ends of the slats, and means to displace the pins, thereby to vary the diameter of the pulley.

7. An expansible pulley comprising a cylindrical member, a plurality of slats positioned on the periphery of the cylindrical member, a plurality of pins disposed in the cylindrical member in contact with the slats, a sleeve movably mounted within the cylindrical member, a tapered face on the sleeve for the pins, and means to effect a movement of the sleeve and thereby the pins and the slats.

8. An expansible pulley comprising a cylindrical member, a plurality of slats mounted on the periphery of the member for limited radial movement, a plurality of radially disposed pins positioned in the cylindrical member and having their outer ends in contact with the slats, a sleeve mounted within the cylindrical member for sliding movement with respect thereto, a tapered surface in the sleeve providing a bearing seat for the pins, a plurality of members connected to the sleeve and extending beyond one end of the cylindrical member, and means disposed adjacent the end of the cylindrical member adapted to effect a movement of the members and thereby the sleeve and its associated elements.

9. An expansible pulley comprising a cylindrical member, a shaft disposed along the axis thereof, supporting elements extending between the cylindrical member and the shaft, a plurality of slats disposed around the periphery of the cylindrical member, a plurality of supporting pins for the slats positioned in the cylindrical member, a sleeve mounted within the cylindrical member for sliding movement, a tapered bearing seat for the pins formed on the sleeve, a flange member disposed on the sleeve extending toward the shaft, screw threaded rods disposed in the flange member and projecting therebeyond, gear members secured to the outer ends of the rods, and co-operative gear means positioned on the shaft.

10. An expansible pulley comprising a drum, end plates secured to opposite ends of the drum, a plurality of pairs of slats disposed around the periphery of the drum in end to end relation between the plates and terminating at the mid-portion of the drum, means to secure the outer ends of the slats, radially movable pins supporting the inner ends of the slats, yieldable retaining bands disposed around the slats in proximity to their inner ends, a sleeve positioned within the drum formed with a tapered bearing face for the pins, and means to move the sleeve within the drum to effect a displacement of the inner portions of the slats.

11. An expansible pulley comprising a drum, the outer surface of which is formed with a plurality of axially disposed channels, annular plates secured to either end of the drum and projecting radially beyond the surface thereof, flanges formed on the plates and overlying the end portions of the drum, a plurality of pairs of slats disposed in end to end relation disposed in the channels, the outer end of each slat being of such dimension as to fit loosely within the overlying flanges of the plates, the inner end of each slat being disposed adjacent the mid-portion of the drum, radially disposed pins positioned at the mid-portion of the drum and providing supporting members for the inner ends of the slats, and means to move the pins in a radial direction, whereby the diameter of the pulley is altered at its mid portion, but is substantially unchanged at its end portions.

In witness whereof, I have hereunto signed my name.

ELOV F. MAAS.